W. R. KEMPSTER.
TRACTOR.
APPLICATION FILED NOV. 1, 1916.
1,275,566.
Patented Aug. 13, 1918.
2 SHEETS—SHEET 1.
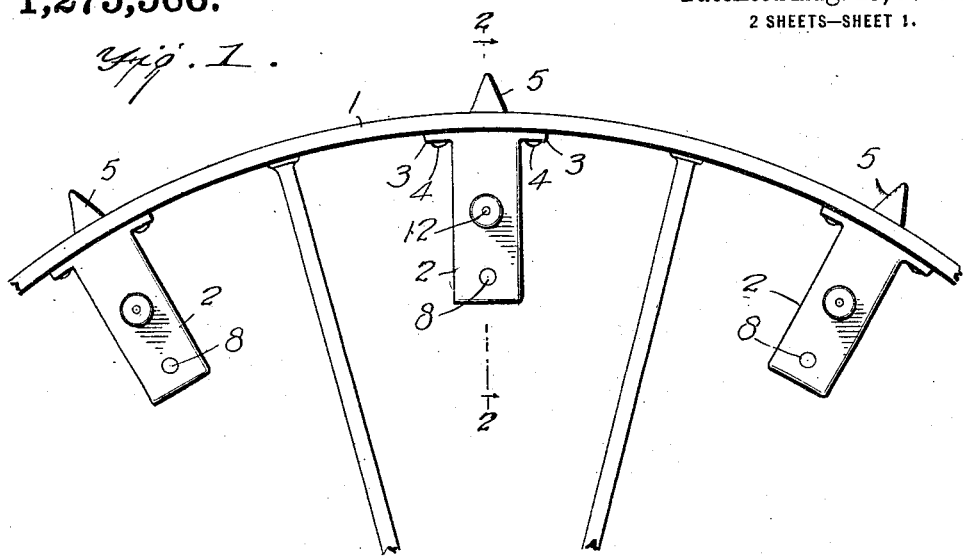
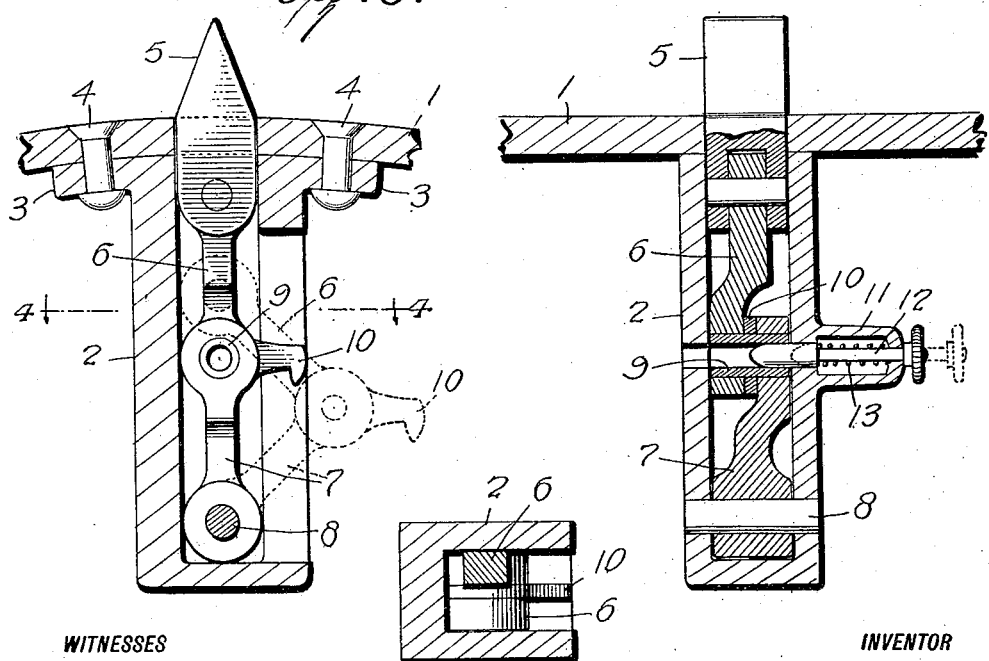
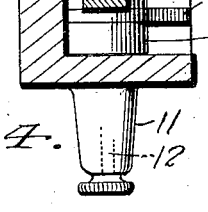
WITNESSES
INVENTOR
WALLACE R. KEMPSTER,
BY
ATTORNEYS W. R. KEMPSTER.
TRACTOR.
APPLICATION FILED NOV. 1, 1916.
1,275,566.
Patented Aug. 13, 1918.
2 SHEETS—SHEET 2.
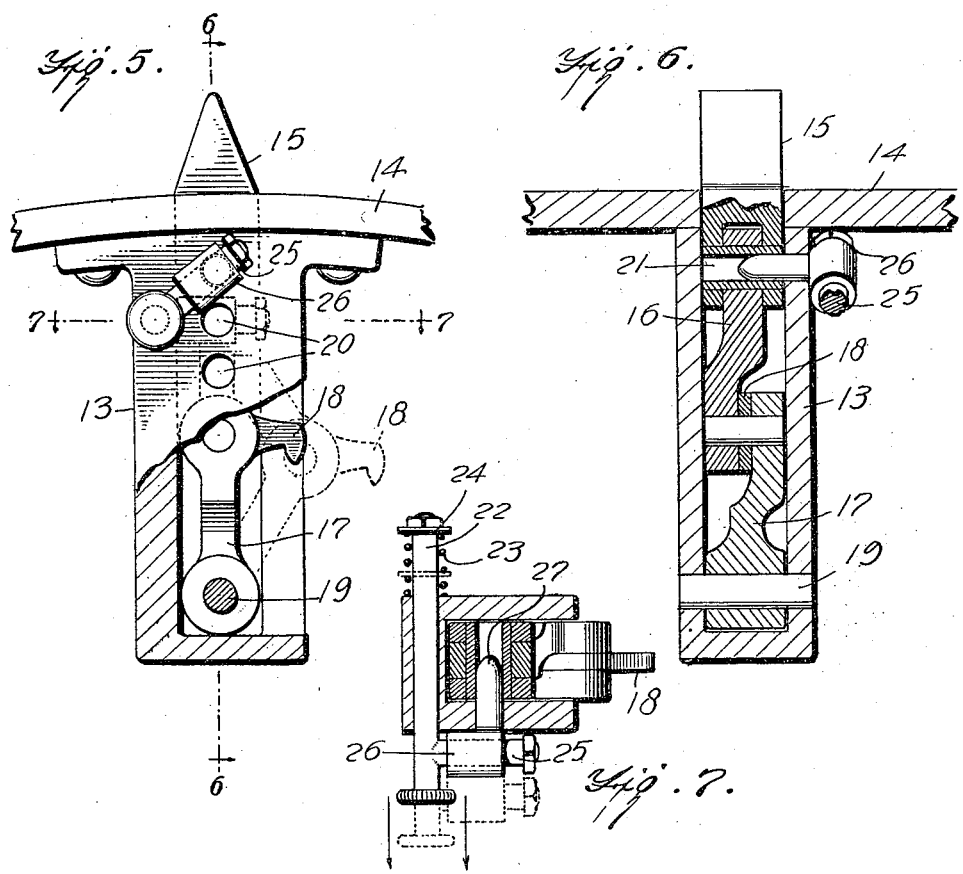
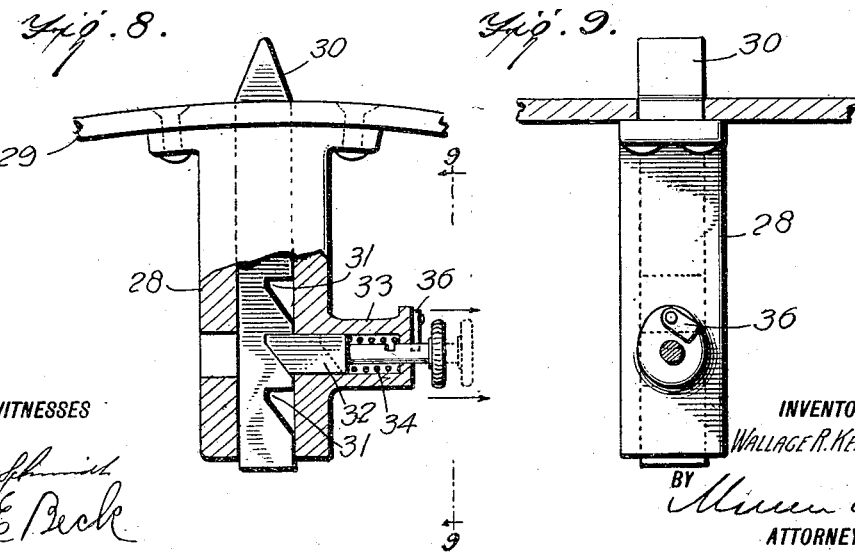
WITNESSES
INVENTOR
WALLACE R. KEMPSTER,
BY
ATTORNEYS

UNITED STATES PATENT OFFICE.

WALLACE R. KEMPSTER, OF WHITESIDE COUNTY, ILLINOIS.

TRACTOR.

1,275,566. Specification of Letters Patent. Patented Aug. 13, 1918.

Application filed November 1, 1916. Serial No. 128,913.

*To all whom it may concern:*

Be it known that I, WALLACE R. KEMPSTER, a citizen of the United States, and a resident of Whiteside county, in the State of Illinois, have invented an Improvement in Tractors, of which the following is a specification.

My invention is an improvement in tractors, and has for its object to provide mechanism in connection with tractor wheels in the form of spuds which may be extended beyond the periphery of the wheel or may be withdrawn within the periphery of the wheel, to assist the wheel in gripping the ground.

In the drawings:

Figure 1 is a partial side view of the wheel with the improved spuds.

Fig. 2 is a section on the line 2—2 of Fig. 1, looking in the direction of the arrows adjacent to the line.

Fig. 3 is a section at right angles to Fig. 2.

Fig. 4 is a section on the line 4—4 of Fig. 3, looking in the direction of the arrows adjacent to the line.

Fig. 5 is a side view partly in section of another embodiment of the invention.

Figs. 6 and 7 are sections on the lines 6—6 and 7—7 of Fig. 5, each view looking in the direction of the arrows adjacent to the line.

Fig. 8 is a view similar to Fig. 5 of another embodiment of the invention.

Fig. 9 is a section on the line 9—9 of Fig. 8, looking in the direction of the arrows adjacent to the line.

In the embodiment of the invention shown in Figs. 1 to 4 inclusive, the rim 1 of the wheel is provided at spaced intervals with casings 2, which have their outer ends open, as shown, in Fig. 3, and opposite side walls of the casing are flanged laterally, as shown at 3, to fit the inner face of the rim, and the said flanges are secured to the rim by rivets 4. The interior of the casings registers with openings in the wheel rim, and spuds, indicated at 5, are mounted to reciprocate in the opening, the outer ends of the spuds being beveled, as shown, to provide a secure gripping on the ground.

These spuds are made to be extended, partially extended, or contracted, as may be desired. Each spud has pivoted thereto one of the members 6 of a toggle joint, consisting of the said member and a member 7 pivoted thereto and to the casing at the end remote from the rim, as indicated at 8.

The connection between the toggle members is a hollow rivet 9 and a hook 10 is connected with the rivet between the members 6 and 7. This hollow rivet is adapted to register with openings in the front and rear walls of the casing, and an extension casing 11 is provided at the said front wall, the said casing being a mounting for a holding pin 12. This pin is normally spring-pressed toward the joint between the toggle members by means of a coil spring 13, and the outer end of the pin has a head for convenience in manipulating the same. The pin 12 passes through the registering openings and the hollow rivet to hold the parts in alinement. That side of the casing adjacent to the outwardly extending hook 10 is open, as shown, to permit the movement of the toggle levers and the hook into and out of the casing. The pin 12 is adapted to engage within the hollow rivet, as before stated, to hold the toggle in alinement, and with the spud extended. When it is desired to contract the spud, the hook is engaged by a suitable tool, after the pin is withdrawn, and the toggle is broken, as indicated in dotted lines in Fig. 3.

In the embodiment of the invention shown in Figs. 5 to 7, the casing 13, corresponding to the casing 2, is secured to the rim 14 in the same manner, and the spuds 15 are connected to the casing by the toggle members 16 and 17. The hook 18 is connected with the joint between the toggle, and the toggle member 17 is pivoted to the casing at 19. Three openings 20 are provided in the casing, and with these openings is adapted to aline the bore of the hollow rivet 21 which connects the toggle member 16 to the spud. A bolt 22 is passed transversely through an opening of the casing at the side remote from the hook 18, and a spring 23 encircles the bolt between the casing and a spud 24 in the form of a nut and washer, and the spring acts normally to hold the bolt in the full line position of Fig. 7. This bolt has a head at the opposite end from the spud 24 and a lateral arm 25 adjacent to the head. Upon the arm is arranged a bearing 26 having a pin 27, which is adapted to engage one of the openings 20, and the hollow rivet 21. By means of the head the bolt may be rotated to bring the pin 27 into register with either of the series of openings 20, and the spring 23 will hold the pin in engagement with the opening and the rivet. With this construction, the spud may be entirely extended, entirely contracted, or partially extended, and may be held firmly in such position by means of the pin 27.

In the embodiment of the invention shown in Figs. 8 and 9, the casing 28, which corresponds to the casing 2, is secured to the rim 29 in the same manner, and the spud 30 is in the form of a bar, which is mounted to slide in the casing. The bolt has notches 31 in one side, and these notches are adapted for engagement by a latch member 32, which is mounted to slide in an extension 33 from the casing. The outer end of the latch member has a head, and a spring 34 within the extension normally presses the latch member into engagement with the notches. The stem of the latch member is provided with notches 35 which are adapted for engagement by a latch plate 36 pivoted to the extension, to hold the latch member in operative or in inoperative position. Three notches 31 are provided, and it will be obvious that the spud may be entirely contracted, or partially extended.

I claim:

In combination with the rim of a wheel having radial openings, of casings secured to the rim at the openings, spuds in the casing adapted to be extended beyond the periphery of the rim or to be contracted within the rim, a pair of levers connecting each spud with its casing, each pair of levers being pivotally connected at their adjacent ends and pivoted to the spud and to the casing, a hook at the joint of each pair of levers, the casing having a slot through which the hook extends, and a lock for holding each spud extended.

WALLACE R. KEMPSTER.

Copies of this patent may be obtained for five cents each, by addressing the "Commissioner of Patents, Washington, D. C."